S. D. LOCKE.
Spool and Take-Up for Grain-Binders.
No. 207,612. Patented Sept. 3, 1878.
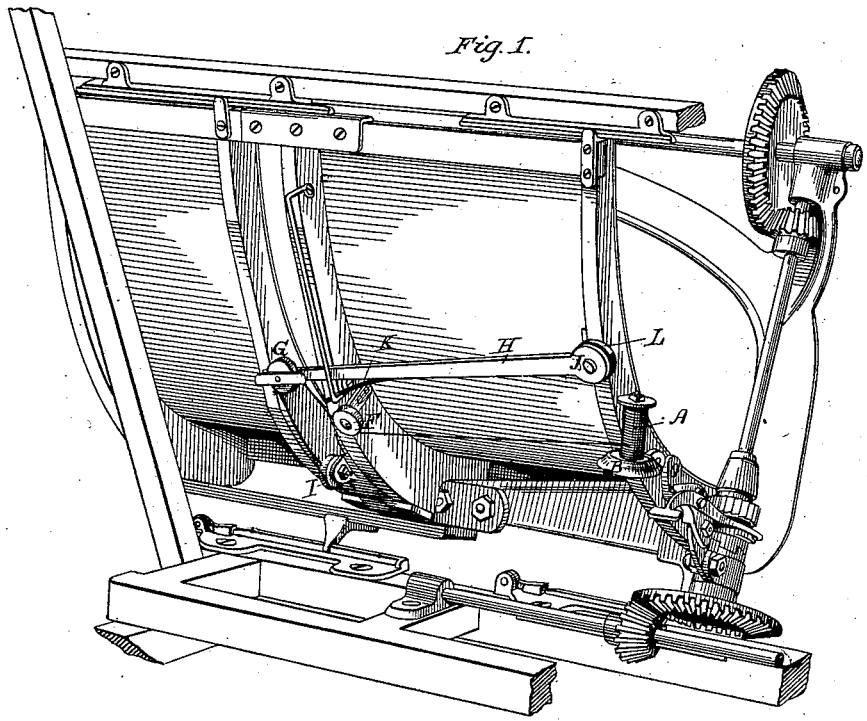
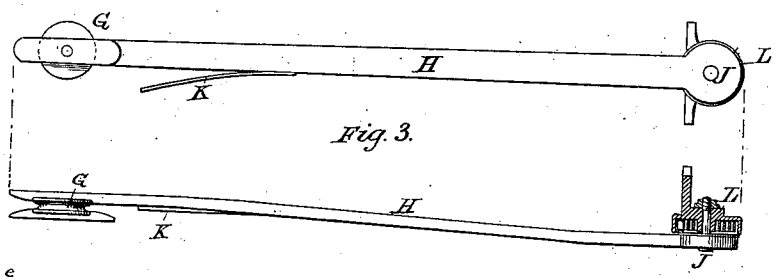
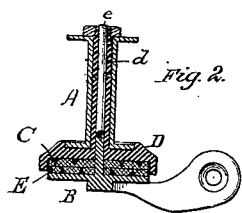
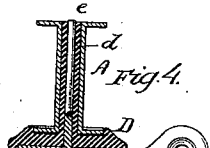
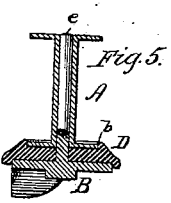
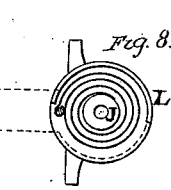
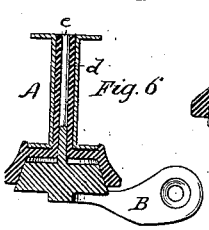
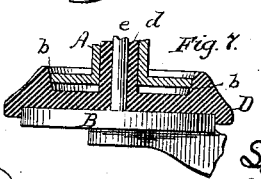
WITNESSES:
C. Clarence Poole
J. S. Post
INVENTOR:
S. D. Locke
By his Atty
R. H. C. Smith

UNITED STATES PATENT OFFICE.

SYLVANUS D. LOCKE, OF HOOSICK FALLS, NEW YORK.

IMPROVEMENT IN SPOOL AND TAKE-UP FOR GRAIN-BINDERS.

Specification forming part of Letters Patent No. 207,612, dated September 3, 1878; application filed April 19, 1878.

*To all whom it may concern:*

Be it known that I, SYLVANUS D. LOCKE, of Hoosick Falls, in the county of Rensselaer and State of New York, have invented an Improved Spool and Take-Up for Automatic Binders; and I do hereby declare the following to be a full and clear description of the same.

In binding-machines it is important, when the binding material is drawn from a spool, that the spool shall unwind easily and freely with but little friction, and yet that its momentum shall be immediately checked when the withdrawing strain shall cease, because, when a spool weighing several pounds is subjected to a sudden strain to unwind a portion of its contents, it will acquire sufficient momentum to continue its revolution for a time, and give off band material sufficient to make objectionable slack.

Heretofore the spool has been secured by means of nuts or other fastening devices, and the requisite tension has been secured by springs acting against the spool. The use of nuts, &c., is objectionable, because they are detachable parts, liable to be lost or mislaid when removed in the field, as they are required to be, and because the removal and replacement of such a fastening whenever the spool is to be changed consumes valuable time. The use of springs for tension is objectionable, because springs are in themselves variable in quality, no two being alike. They require adjustment at the hands of unskillful persons, and are sources of continual trouble. They necessarily act upon some certain part of the spool, and therefore with a uniform retarding force, while the counter motive force is constantly varying and decreasing in effect as the diameter of the spool decreases.

The first part of my invention relates to the spool; and consists in a method of preventing the excessive discharge of wire by reason of momentum, by means of frictional resistance variable in proportion to the variable power applied to the spool as its diameter diminishes; also, in the method of securing the spool upon the spool-stand.

The second part of my invention relates to the take-up; and consists of a supplemental or bearing spring, which does not come into action, except to relieve shock on the band-spool when the regular take-up is already under stress.

That others may fully understand my improvement, I will particularly describe it, having reference to the accompanying drawings, wherein—

Figure 1 is a perspective view of the under side of my binder-receptacle, showing the structure and arrangement of the take-up and spool as I prefer them. Fig. 2 is a longitudinal section of the spool and its stand. Fig. 3 represents a take-up arm in plan and elevation. Figs. 4, 5, 6, 7, and 8 are details.

I prefer to employ wire as a band material, and therefore, for convenience, I will so describe it; but it is evident that the only difference in the devices for handling wire or cord is in the mechanism for securing the ends of the band around the sheaf. This patent does not include the band-securing devices, and it is therefore evident that the devices described will apply equally well to either wire or cord.

*The spool.*—At present these spools are manufactured and filled at the wire-factory. Each spool contains about twelve pounds of wire. They are uniform in size, so that when one spool becomes empty it is merely necessary to remove it and place a new one in its stead.

A is the spool, and B is the bracket or spool-stand, which, in my machine, is bolted fast to one of the side bars of the binder-frame in a position where it is conveniently accessible to the attendant, but not in the way of the operative parts of the machine. It may be in any other form, and be secured to any other part of the machine, if, for any reason, it is desirable.

The lower end of the spool enters a cell or seat, *b*, the edges of which project upward around the base of the spool, and prevent the slack of the wire, which will frequently spring off from the spool, from getting under the spool around the spindle. The seat *b* is made on a plate, D, separate from the stand B, and its inner sides are beveled, so that, as the spool is pressed down it will wedge fast and cause the seat-plate to revolve with the spool. This seat is so deep that the sloping side will compensate for any ordinary variations in the diameter of the spools. The seat-plate D has a hollow or sleeve spindle, $d$, preferably running clear through the spool, over which the spool is slipped, and it may be secured there by a nut, key, or other device, if such is found to be necessary. The seat-plate D is compelled to revolve with the spool for the purpose of obtaining by means of said seat-plate the requisite frictional resistance to the revolution of said spool.

As is well known, and as hereinbefore stated, the tension-strain upon the wire is or should be uniform; but as the diameter of the spool diminishes, the strain on the wire to revolve a spool meeting a uniform resistance is constantly increasing. The usual tension produced by a spring acting against some portion of the spool is a uniform resistance, and therefore objectionable, because producing a constantly-increasing strain on the wire as it lessens in amount on the spool, aside from the fact that it involves the use of detachable parts, in themselves troublesome and liable to be misplaced or lost. This irregular strain materially affects the operation of the binding mechanism, as may easily be understood.

I overcome all these objections by an arrangement of frictional resistance dependent upon the weight of the spool, and therefore uniformly diminishing as the diameter of the spool decreases, and it may easily be seen how a little experiment will determine those dimensions of the spool which will give substantially the same ratio of decrease to both pull and resistance. This frictional resistance is obtained by the motion of one body in contact with another—for instance, the seat-plate D upon the upper surface of the spool-stand B. A greater or less amount of friction may be obtained as these surfaces are expanded or contracted; but if the surfaces are metallic, as they rub each other they will become smooth, and their efficiency will be proportionately impaired. I prefer, therefore, to employ leather as facings for these surfaces, because it presents a fibrous texture which will not become smooth by wear, but will maintain about the same degree of roughness until worn out. Other substances may be placed there which will operate in a degree in the same way; but I prefer leather. I therefore place between the opposing faces of the parts B D two disks, C E, of leather. The bottom surface of the plate D is serrated, so that when it is pressed upon the disk of leather, C, said serrations will enter the surface of the leather and cause them to adhere together. This adhesion may be secured by cement, or in other known ways, but not so satisfactorily as by the serrations, because the latter permit the more ready removal and replacement of the leather when worn out than by any other method. The upper surface of the spool-stand B is similarly serrated and provided with a leather disk, E. It is also provided with a central spindle, $e$, over which the sleeve $d$ slides freely. If a little variation in frictional resistance is not thought very objectionable, then only one disk may be used; or the seat-plate D may rest directly on the stand B, as shown in Fig. 7, if their bearing-surfaces are faced smoothly in a lathe or otherwise.

*The take-up.*—From the spool the wire passes over the guide-pulley F, and thence over the pulley G, mounted in the end vibrating take-up arm, H, and back again to the guide-pulley I at the entrance to the rack-box. The arm H is mounted upon a pivot-pin at J, and behind it is a spring-case, L, containing a strong spring, which continually acts to raise said arm against the upper end of its guide.

The devices which convey the wire around the bundle necessarily draw out a definite length of wire; but the bundles themselves vary in size, and this length of wire will frequently be too much for the purpose. The take-up is provided for the purpose of taking back any slack thus formed, and thereby binding bundles of different sizes with uniform tightness.

When the bundles are large and no slack formed, the take-up will be drawn down to its limit, no slack being formed, when the wire is severed, and the new end is seized and the wire drawn out again. Its start is suddenly from a place of rest, and the initial strain is much in excess of the after-pull when the spool has begun to revolve. This also occurs upon any sudden starting of the team or quickening of the speed of the machine as heretofore constructed. This extra strain upon the wire will be transmitted direct to the spool, and frequently causes the breaking of the wire. To obviate this undesirable result without adding to the ordinary tension, I have provided the take-up with a supplemental spring strong enough to resist the shock of this sudden starting or strain and transmit a reduced strain to the spool, thereby giving time to overcome the inertia of the spool without overstraining the wire.

In the organization of the take-up shown in the drawing the supplemental spring K is placed under the free end of the take-up arm; but it is evident a spring for the same purpose may be applied in any suitable place or manner to this arm or to any other take-up; and therefore I do not limit myself to the structure shown in the take-up H.

The invention may be applied with facility to a take-up rotary in action as well as to one which reciprocates.

Having described my invention, what I claim as new is—

1. A spool-stand provided with friction-plates to form a tension, and one of said plates adapted to receive a spool, whereby the weight of the spool, its contents, and attachments is superimposed upon said stand, and frictional resistance is variable in proportion to the discharge of the contents of the spool.

2. A spool-tension with plates B D, having serrated opposing surfaces to engage and hold to the facings, combined with one or more leather facing-disks, as set forth.

3. A spool-stand having a rotating plate, D, to which the tension is applied, provided with a conical seat, b, within which the end of the spool may be wedged fast, to hold the spool and prevent the wire from getting beneath it, as set forth.

4. A spool-stand, B, with frictional upper surface faced with leather or otherwise, combined with a spool-seat plate, D, the outer edge of which is overhanging, to cover and prevent the access of wet and dirt to the tension friction-surface.

5. An intermediate slack take-up having a supplemental spring capable of resisting the ordinary pulling strain, but yielding to sudden and extra strains incident to stopping and starting of the mechanism, sudden changes of speed, &c.

6. An intermediate slack-take-up arm actuated by a spring at its pivoted end, and provided with a supplemental cushioning-spring, to yield only to sudden or extraordinary strains, as set forth.

7. An intermediate slack-take-up arm, H, pivoted at one end, with an actuating-spring, and provided with a guide-pulley at its free end, combined with the supplemental spring K, which is so adjusted that it comes into action only as a re-enforce after the limit assigned the actuating-spring has been reached.

S. D. LOCKE.

Witnesses:
R. D. O. SMITH,
C. CLARENCE POOLE.